CHARLES TIVNAN.
Improvement in Screws for Water Gauges.
No. 115,658.
Patented June 6, 1871.
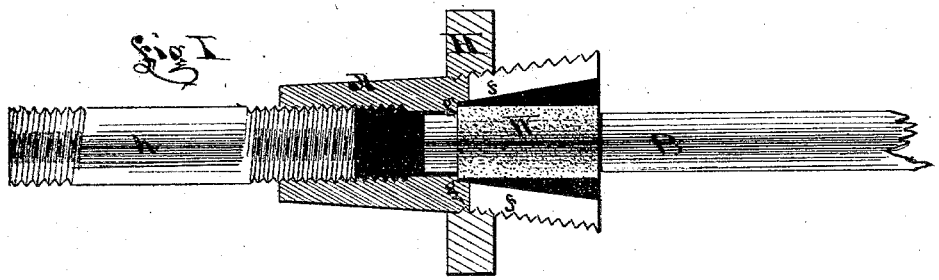
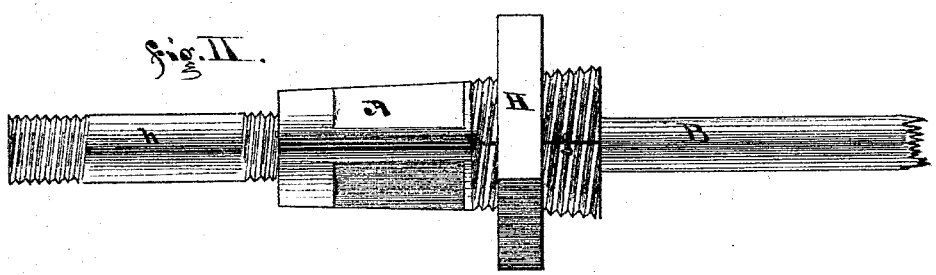
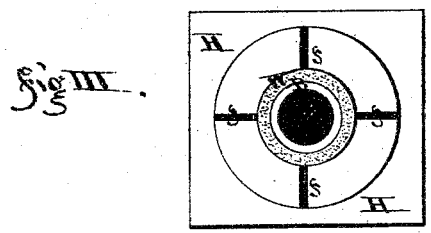
Inventor.
Charles Tivnan
by his attornies
Gardiner & Hyde
Witnesses,
Wm. B. Parker.
L. V. Sweith

UNITED STATES PATENT OFFICE.

CHARLES TIVNAN, OF HOLYOKE, MASSACHUSETTS.

IMPROVEMENT IN SCREWS FOR WATER-GAGES.

Specification forming part of Letters Patent No. 115,658, dated June 6, 1871.

I, CHARLES TIVNAN, of Holyoke, in the county of Hampden and State of Massachusetts, have invented certain Improvements in the Screws for Water-Gages, of which the following is a specification:

Nature and Objects of the Invention.

My invention relates to the peculiar construction of the screw with its nut that receives and holds either end of the glass tube of a water-gage, in combination with a rubber or other elastic packing fitting within the same and around the end of the glass tube; the object of my invention being to provide a way of securing the ends of the tube so that they shall not leak and cannot be broken, neither by their own expansion nor the contraction of the screw.

Description of Accompanying Drawing.

Figure I is a sectional plan view, Fig. II a side view, and Fig. III an end view of my invention.

General Description.

A is the case of the screw, having a thread in one end for the reception of the pipe $h$, which is connected by an elbow directly to the boiler, and having the other end made conical externally and internally, as shown in Fig. I, the base of the cone being the face of the end in which the glass tube goes. The external surface of this partial cone has cut upon it screw-threads, upon which works the nut H. I make down the screw the slits $fff$, &c., as many as may be desired, radiating from the center of the glass tube B, and extending the depth of the thread upon the screw, so that when the nut H is moved toward the end of the screw it may be compressed. On and upon the end of the tube B I place an elastic packing, W, for which purpose I prefer a piece of rubber tubing of from one-sixteenth to one-eighth inch in thickness. This end is then placed in the conical end of the screw, the shoulder $g$ preventing the packing from going too far in. The nut H is then screwed over the compressed end of the screw until the packing is firmly compressed and a tight joint is formed. There can be no leakage, and the glass does not come into contact with the metal, and any expansion or contraction, either of glass or metal, is taken up by the elastic packing. Various-sized glass tubes may also be used in a gage having my screws.

Claims.

What I claim is—

1. In the combination consisting of the glass tube B, elastic packing W, conical hollow screw and case A with slits $ff$, and nut H, the glass tube B entering loosely into the case A and not in contact with metal, substantially as and for the purpose set forth.

2. In the same combination, the shoulder $g$, substantially as and for the purpose set forth.

CHARLES TIVNAN.

Witnesses:
E. W. CHAPIN,
H. C. COLLY.